USO09954746B2

United States Patent
Kashtan et al.

(10) Patent No.: US 9,954,746 B2
(45) Date of Patent: Apr. 24, 2018

(54) AUTOMATICALLY GENERATING SERVICE DOCUMENTATION BASED ON ACTUAL USAGE

(71) Applicant: Microsoft Technology Licensing, LLC, Redmond, WA (US)

(72) Inventors: Guy Kashtan, Hertzlyia (IL); Saar Yahalom, Tel-Aviv (IL); Benny Schlesinger, Ramat Hasharon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 210 days.

(21) Appl. No.: 14/794,906

(22) Filed: Jul. 9, 2015

(65) Prior Publication Data

US 2017/0012838 A1 Jan. 12, 2017

(51) Int. Cl.
| H04L 12/26 | (2006.01) |
| H04L 29/08 | (2006.01) |
| G06F 9/44 | (2018.01) |
| H04L 12/24 | (2006.01) |

(52) U.S. Cl.
CPC .......... *H04L 43/06* (2013.01); *G06F 8/73* (2013.01); *H04L 41/0273* (2013.01); *H04L 43/062* (2013.01); *H04L 67/02* (2013.01); *H04L 43/0876* (2013.01)

(58) Field of Classification Search
CPC ..... H04L 43/06; H04L 43/0876; H04L 67/02; H04L 12/2602; G06F 8/73
See application file for complete search history.

(56) References Cited

U.S. PATENT DOCUMENTS

| 4,860,203 A | 8/1989 | Corrigan et al. |
| 5,038,316 A | 8/1991 | Hempleman et al. |
| 7,188,336 B2 | 3/2007 | Humphries |
| 7,533,369 B2 | 5/2009 | Sundararajan et al. |
| 7,568,184 B1 | 7/2009 | Roth |
| 7,620,885 B2 | 11/2009 | Moulckers et al. |
| 8,307,341 B2 | 11/2012 | Eykholt |
| 8,819,629 B2 | 8/2014 | Sherrill |
| 9,356,883 B1 * | 5/2016 | Borthakur ........... H04L 41/5025 |
| 2002/0059348 A1 | 5/2002 | Lee et al. |

(Continued)

OTHER PUBLICATIONS

Ulf Lamping et al. "Wireshark User's Guide for Wireshark 1.7" Retrieved on Apr. 17, 2017 from <http://www.lexialearning.co.nz/docs/wiresharkguide.pdf>.*
Sharpe et al., "Wireshark user's Guide for Wireshark", Published by Ulf Laming, Jul. 5, 2011, 242 Pages.
"International Search Report and Written Opinion Issued in PCT Application No. PCT/US2016/041412", dated Oct. 5, 2016, 11 Pages.

(Continued)

*Primary Examiner* — Dustin Nguyen
*Assistant Examiner* — Juan C Turriate Gastulo

(57) ABSTRACT

A computer system automatically generates service documentation based on usage of a web service. The computer system captures network traffic including actual requests to a service endpoint of the web service and actual responses from the service endpoint of the web service. The captured network traffic can be analyzed using machine learning to determine one or more operations that are available at the service endpoint, input arguments that are accepted by the service endpoint, and output arguments that are provided by the service endpoint. The computer system can automatically generate service documentation for the web service based on metadata that identifies the operations, the input arguments, and the output arguments.

20 Claims, 5 Drawing Sheets

(56) References Cited

U.S. PATENT DOCUMENTS

| | | | |
|---|---|---|---|
| 2003/0037312 A1 | 2/2003 | Czech | |
| 2006/0206789 A1 | 9/2006 | Bakman et al. | |
| 2006/0248540 A1 | 11/2006 | Sterner et al. | |
| 2007/0022199 A1* | 1/2007 | Tatsubori | H04L 67/2804 709/227 |
| 2008/0250394 A1 | 10/2008 | Jones et al. | |
| 2011/0273988 A1* | 11/2011 | Tourrilhes | H04L 41/0816 370/237 |
| 2012/0159442 A1 | 6/2012 | Dearman et al. | |
| 2013/0007767 A1* | 1/2013 | Leming | G06F 8/73 719/314 |
| 2014/0282403 A1 | 9/2014 | Frenkiel | |
| 2015/0363215 A1* | 12/2015 | Versteeg | G06F 11/3664 703/23 |
| 2016/0337333 A1* | 11/2016 | Rollet | H04L 63/08 |

OTHER PUBLICATIONS

Surmacz, Tomasz, "Rapid Protocol Development in Wireless Sensor Networks using Wireshark Plugins", In Proceeding of the International Conference on Computer Aided Systems Theory, Feb. 10, 2013, pp. 426-433.

Jiang et al., "Abstracting Execution Logs to Execution Events for Enterprise Applications", In Proceedings of the Eighth International Conference on Quality Software, Aug. 12, 2008, 6 pages.

"Second Written Opinion Issued in PCT Application No. PCT/US2016/041412", dated Jun. 7, 2017, 6 Pages.

"International Preliminary Report on Patentability Issued in PCT Application No. PCT/US2016/041412", dated Aug. 8, 2017, 8 Pages.

\* cited by examiner

AUTOMATICALLY GENERATING SERVICE DOCUMENTATION BASED ON ACTUAL USAGE

BACKGROUND

Web services typically require service documentation to facilitate use by clients. Producing and updating service documentation can be tedious and time consuming for a developer of a web service. The developer often will manually embed descriptive metadata in source code and then manually generate service documentation from the embedded metadata. This manual process introduces significant overhead into the development process. To alleviate some of this burden, partial documentation is sometimes automatically generated by statistically analyzing the source code. This automatic process, however, requires access to the source code of the web service.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a computer system automatically generates service documentation based on usage of a web service. The computer system captures network traffic including actual requests to a service endpoint of the web service and actual responses from the service endpoint of the web service. The captured network traffic can be analyzed using machine learning to determine one or more operations that are available at the service endpoint, input arguments that are accepted by the service endpoint, and output arguments that are provided by the service endpoint. The computer system can automatically generate service documentation for the web service based on metadata that identifies the operations, the input arguments, and the output arguments.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more aspects of the described subject matter. It is to be appreciated, however, that such aspects can be practiced without these specific details. While certain components are shown in block diagram form to describe one or more aspects, it is to be understood that functionality performed by a single component can be performed by multiple components. Similarly, a single component can be configured to perform functionality described as being performed by multiple components.

Various aspects of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Figure 1:
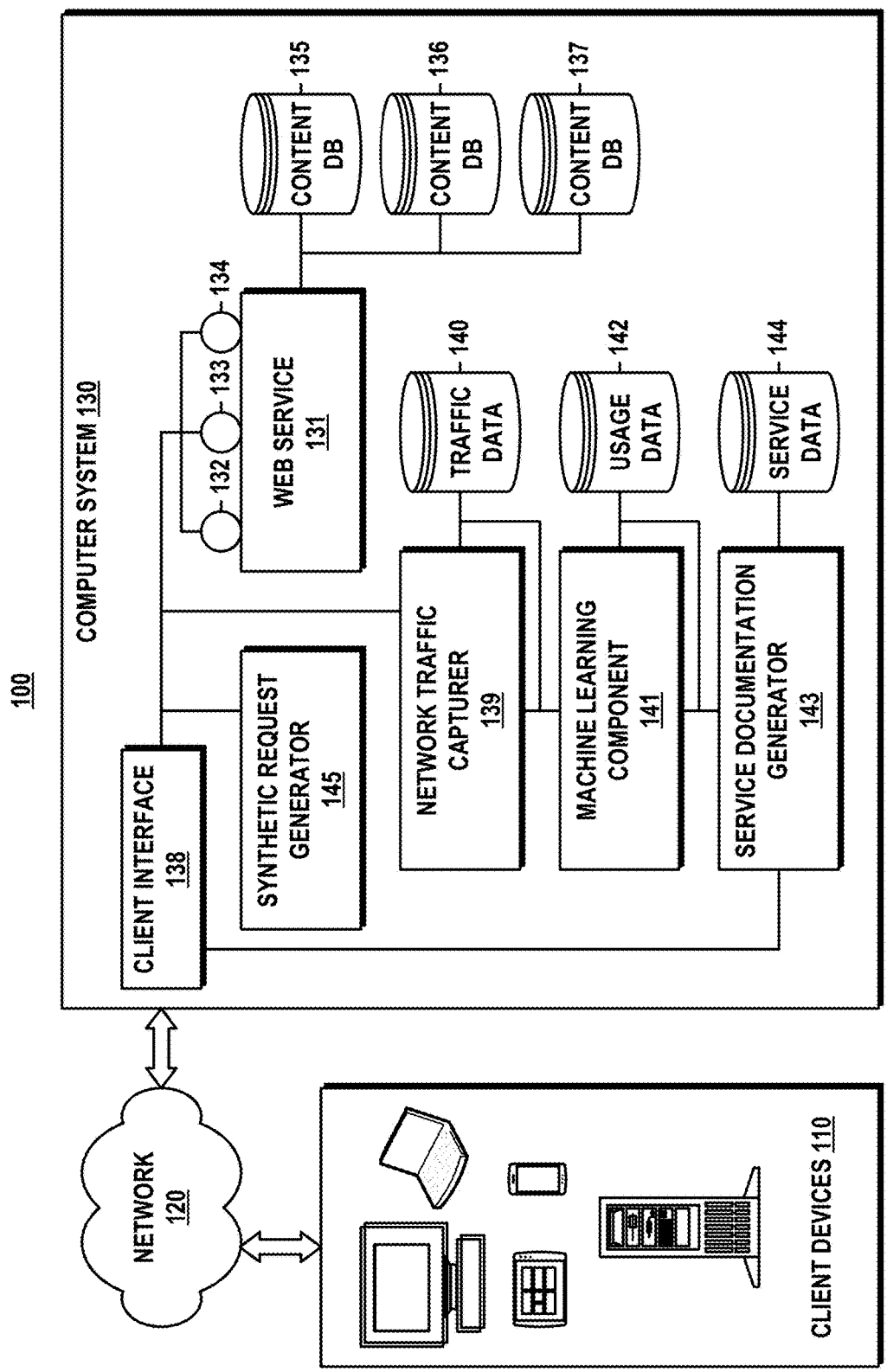
FIG. 1 illustrates an embodiment of an exemplary operating environment that can implement aspects of the described subject matter.

FIG. 1 illustrates an operating environment 100 as an embodiment of an exemplary operating environment that can implement aspects of the described subject matter. It is to be appreciated that aspects of the described subject matter can be implemented by various types of operating environments, computer networks, platforms, frameworks, computer architectures, and/or computing devices.

Implementations of operating environment 100 are described in the context of a computing device and/or a computer system configured to perform various steps, methods, and/or functionality in accordance with aspects of the described subject matter. It is to be appreciated that a computer system can be implemented by one or more computing devices. Implementations of operating environment 100 also are described in the context of "computer-executable instructions" that are executed to perform various steps, methods, and/or functionality in accordance with aspects of the described subject matter.

In general, a computing device and/or computer system can include one or more processors and storage devices (e.g., memory and disk drives) as well as various input devices, output devices, communication interfaces, and/or other types of devices. A computing device and/or computer system also can include a combination of hardware and software. It can be appreciated that various types of computer-readable storage media can be part of a computing device and/or computer system. As used herein, the terms "computer-readable storage media" and "computer-readable storage medium" do not mean and unequivocally exclude a propagated signal, a modulated data signal, a carrier wave, or any other type of transitory computer-readable medium. In various implementations, a computing device and/or computer system can include a processor configured to execute computer-executable instructions and a computer-readable storage medium (e.g., memory and/or additional hardware storage) storing computer-executable instructions configured to perform various steps, methods, and/or functionality in accordance with aspects of the described subject matter.

Computer-executable instructions can be embodied and/or implemented in various ways such as by a computer program (e.g., client program and/or server program), a software application (e.g., client application and/or server application), software code, application code, source code, executable files, executable components, program modules, routines, application programming interfaces (APIs), functions, methods, objects, properties, data structures, data types, and/or the like. Computer-executable instructions can be stored on one or more computer-readable storage media and can be executed by one or more processors, computing devices, and/or computer systems to perform particular tasks or implement particular data types in accordance with aspects of the described subject matter.

As shown, operating environment 100 includes client devices 110 that communicate over a network 120 with a computer system 130. Client devices 110 can be implemented by various types of user-facing computing devices such as a workstation or desktop computer, a laptop computer, a tablet device, a smartphone, and/or other type of computing device. Alternatively or additionally, client devices 110 can be implemented by a server computer such as a physical, on-premises server computer of an enterprise. It is to be understood that the number and types of client devices 110 are provided for purposes of illustration and that operating environment 100 can include a greater or fewer number of client device(s) 110.

Network 120 can be implemented by any type of network or combination of networks including, without limitation: a wide area network (WAN) such as the Internet, a local area network (LAN), a Peer-to-Peer (P2P) network, a telephone network, a private network, a public network, a packet network, a circuit-switched network, a wired network, and/or a wireless network. Client devices 110 and computer system 130 can communicate via network 120 using various communication protocols (e.g., Internet communication protocols, WAN communication protocols, LAN communications protocols, P2P protocols, telephony protocols, and/or other network communication protocols), various authentication protocols (e.g., Kerberos authentication, NT LAN Manager (NTLM) authentication, Digest authentication, and/or other authentication protocols), and/or various data types (web-based data types, audio data types, video data types, image data types, messaging data types, signaling data types, and/or other data types).

Computer system 130 can be implemented by one or more computing devices such as server computers configured to provide various types of services and/or data stores in accordance with aspects of the described subject matter. Exemplary severs computers can include, without limitation: web servers, front end servers, application servers, database servers (e.g., SQL servers), domain controllers, domain name servers, directory servers, and/or other suitable computers. Computer system 130 can be implemented as a distributed computing system in which components are located on different computing devices that are connected to each other through network (e.g., wired and/or wireless) and/or other forms of direct and/or indirect connections.

In some implementations, computer system 130 can provide hosted and/or cloud-based services using redundant and geographically dispersed datacenters with each datacenter including an infrastructure of physical servers. For instance, computer system 130 can be implemented by physical servers of a datacenter that provide shared computing and storage resources and that host virtual machines having various roles for performing different tasks in conjunction with providing cloud-based services. Exemplary virtual machine roles can include, without limitation: web server, front end server, application server, database server (e.g., SQL server), domain controller, domain name server, directory server, and/or other suitable machine roles.

In implementations where user-related data is utilized, providers (e.g., client devices 110, applications, etc.) and consumers (e.g., computer system 130, web service, cloud-based service, etc.) of such user-related data can employ a variety of mechanisms in the interests of user privacy and information protection. Such mechanisms can include, without limitation: requiring authorization to monitor, collect, or report data; enabling users to opt in and opt out of data monitoring, collecting, and reporting; employing privacy rules to prevent certain data from being monitored, collected, or reported; providing functionality for anonymizing, truncating, or obfuscating sensitive data which is permitted to be monitored, collected, or reported; employing data retention policies for protecting and purging data; and/or other suitable mechanisms for protecting user privacy.

Automatically Generating Service Documentation

In accordance with aspects of the described subject matter, computer system 130 can perform various operations for automatically generating service documentation based on actual usage. As shown in FIG. 1, computer system 130 hosts a web service 131 for which service documentation is to be generated. Web service 131 can be implemented by various types of web services, service applications, and/or cloud-based services that are accessible to client devices 110. In some implementations, web service 131 can be deployed in a development environment such as Microsoft Visual Studio® or other suitable development environment.

Web service 131 includes multiples service endpoints 132-134 for accessing the functionality of web service 131. Each of service endpoints 132-134 can be identified by a specific address (e.g., Uniform Resource Locator, (URL), Uniform Resource Identifier (URI), and/or other suitable network address) for connecting to a particular portion of web service 131. In various implementations, each of service endpoints 132-134 can be associated with a different function and/or operation of web service 131.

Web service 131 can be configured to provide content from and/or perform operations on various types of data stores such as content databases 135-137. For instance, web service 131 can provide content from one or more content databases 135-137 in response to requests from client devices 110. Web service 131 also can support operations such as Create, Read, Update and Delete (CRUD) operations on databases 135-137. Each of content databases 135-137 can store data (e.g., web data, message data, document data, etc.) that can be presented, stored, retrieved, and/or manipulated by client devices 110 when interacting with web service 131. Content databases 135-137 can be associated with functions or portions of web service 131, associated with service endpoints 132-134, and/or associated with subsets of users.

Computer system 130 provides a client interface 138 that can be called and/or utilized by client devices 110 to communicate with web service 131. Client interface 138 can include and/or expose one or more APIs for receiving requests and providing responses to client devices 110. In some implementations, client interface 138 can include an API for each of service endpoints 132-134. Client interface 138 can expose methods that correspond to operations supported by web service 131 and/or specify a service contract regarding security and/or quality of service policies defined for web service 131. Client interface 138 can be implemented by a Representational State Transfer (REST) interface, Remote Procedure Call (RPC) interface (e.g., XML RPC), Simple Object Access Protocol (SOAP) interface, and/or other suitable web service interface.

As shown in FIG. 1, computer system 130 can include one or more computer program modules and data stores for automatically generating service documentation based on actual usage. Computer program modules of computer system 130 can be implemented by computer-executable instructions that are stored on one or more computer-readable storage media and that are executed to perform various steps, methods, and/or functionality in accordance with aspects of the described subject matter. While such computer program modules are shown in block diagram form to describe certain functionality, it is to be understood that the functionality performed by a single computer program module can be performed by multiple computer program modules and that a single computer program module can be configured to perform functionality described as being performed by multiple computer program modules. It is also to be understood that separate data stores can include multiple data stores and/or can be integrated with each other in some implementations.

Computer system 130 includes a network traffic capturer 139 configured to monitor and capture network traffic between client devices 110 and web service 131. Computer system 130 can utilize network traffic capturer 139 to monitor and capture network traffic transmitted over network 120 for storage and/or analysis. The network traffic includes actual requests to web service 131 and actual responses from web service 131. The network traffic can correspond to a community of users of web service 131, one or more subsets of users, a particular time frame, and so forth. Network traffic capturer 139 can store captured network traffic in traffic data storage 140 in the sequence in which it was received or in any logical or random sequence. When collecting requests and/or responses, network traffic capturer 139 can employ a variety of mechanisms in the interests of user privacy and information protection, as described above.

Network traffic capturer 139 can detect and capture actual requests such as Hypertext Transfer Protocol (HTTP) requests issued by client devices 110 to service endpoints 132-134 and/or web service 131. A captured HTTP request can include a method (e.g., GET, PUT, POST, DELETE, HEAD, CONNECT, OPTIONS, TRACE, etc.), a path (e.g., URL, URI, etc.), a version (e.g., HTTP 1.1, etc.), header fields (e.g., Accept-Charset, Accept-Encoding, Accept-Language, Accept-Datetime, Authorization, Connection, Cookie, Content-Length, Content-Type, Date, Host, If-Modified-Since, Referer, User-Agent, etc.) and header values, and an optional request message body that can include client-supplied data, name-value pairs, query strings, uploaded files, and/or other content.

Network traffic capturer 139 also can detect and capture actual responses such as HTTP responses provided by web service 131 to client devices 110. A captured HTTP response can include a version (e.g., HTTP 1.1, etc.), a status code, a reason (e.g., OK, Created, No Content, Bad Request, Unauthorized, Not Found, Server Error, Service Unavailable, etc.), header fields (e.g., Age, Allow, Connection, Content-Encoding, Content-Length, Content-Type, Date, Expires, Last-Modified, Location, Server, etc.) and header values, and an optional response message body that can include service-provided data, requested resources, and/or other content.

Computer system 130 includes a machine learning component 141 configured to analyze captured network traffic and to generate metadata and/or statistics based on the actual usage of web service 131. Machine learning component 141 can receive captured network traffic from network traffic capturer 139 for analysis and/or can analyze captured network traffic that is stored in traffic data storage 140. Machine learning component 141 can store usage data including metadata and statistics in usage data storage 142.

By analyzing captured network traffic, machine learning component 141 can identify characteristics of web service 131 and can generate metadata and/or statistics based on the actual usage of web service 131. In various implementations, machine learning component 141 can analyze captured network traffic by employing one or more machine learning techniques (e.g., supervised, semi-supervised, unsupervised, and/or combination thereof) based on probabilistic and/or statistical-based models including, for example: generative models (e.g., Hidden Markov Model (HMM), Naive Bayes, probabilistic context free grammars, and the like), discriminative models (e.g., SVM, Conditional Random Fields (CRFs), decision trees, neural networks, linear regression, and the like), and/or a combination thereof.

Machine learning component 141 can analyze requests to and responses from web service 131 and can generate metadata that identifies the APIs and/or service endpoints 132-134 of web service 131. Actual requests and responses can be analyzed to determine how frequently the APIs or service endpoints 132-134 are used. Machine learning component 141 can compile statistics regarding the actual and/or relative usage of the APIs and service endpoints 132-134 of web service 131.

Actual requests and responses can be analyzed to determine or infer operations that are available at each API and/or service endpoint of web service 131. Machine learning component 141 can generate metadata that lists operations available at the APIs and/or service endpoints 132-134 of web service 131. The metadata can indicate which operations of web service 131 are more commonly used, better tested, and/or recommended for use. For each API or service endpoint, machine learning component 141 can compile statistics regarding the frequency and/or relative use of each operation.

Machine learning component 141 can examine requests that successfully receive a response from web service 131. Successful requests can be analyzed to determine common types of requests that are directed to the APIs and/or service endpoints 132-134 of web service 131. Corresponding responses can be analyzed to determine common types of output provided by web service 131 and/or service endpoints 132-134. Machine learning component 141 can select actual requests and responses from captured network traffic for use as samples and can generate metadata that includes sample requests and responses. Selecting requests and responses that are frequently observed as the samples ensures that the samples will be relevant and useful to consumers of the service documentation.

Requests to and responses from APIs and/or service endpoints 132-134 of web service 131 can include various types of arguments such as parameters, values, name-value pairs, strings, and/or other data supplied in the header or body. Machine learning component 141 can examine the header and body of actual requests (e.g., HTTP requests) to determine or infer the types of input arguments (e.g., methods, paths, headers, client-supplied data, etc.) that are accepted by each API and/or service endpoint of web service 131. Requests can be analyzed to determine which input arguments are mandatory and which input arguments are optional for each API or service endpoint of web service 131. For example, machine learning component 141 can identify certain headers or parameters that consistently appear in every successful request as being mandatory. Machine learning component 141 also can identify mandatory input arguments by examining requests that failed. For instance, headers and parameters that are contained in successful requests but are missing from failed requests can be considered mandatory.

Captured network traffic can be analyzed by machine learning component 141 to identify possible variations of the inputs to and the outputs from the APIs and/or service endpoints 132-134 of web service 131. Machine learning component 141 can identify characteristics or patterns exhibited by successful requests to determine or infer types and/or values of acceptable, common, or possible input arguments. In some cases, machine learning component 141 can determine a range of values for each input argument. For each API or service endpoint, machine learning component 141 can calculate and/or compile statistics for types and/or values of input arguments.

Machine learning component 141 can analyze corresponding responses to requests for determining or inferring output provided by web service 131. The header and body of actual responses (e.g., HTTP responses) can be analyzed by machine learning component 141 to determine or infer the types of output arguments (e.g., status codes, reasons, headers, service-provided data, requested resources, etc.) provided by each API and/or service endpoint for successful or failed requests. For each API or service endpoint, machine learning component 141 can calculate and/or compile statistics for types and/or values of output arguments.

Machine learning component 141 can generate metadata based on the analysis of the flow of requests to and response from web service 131. Metadata can be generated for the operations provided by each of service endpoints 132-134 and can include request information and response information for each operation. The request information can identify the name and type of various input arguments supplied in successful requests and can indicate whether such input arguments are mandatory or optional. The request information also can provide frequent values for each mandatory or optional input argument. The response information can identify the name and type of various output arguments provided in responses and can list status codes and reasons for successful and failed requests. The response information also can provide frequent values for each output argument.

If there are multiple versions of web service 131, machine learning component 141 can analyze network traffic and generate metadata for each version of web service 131. Machine learning component 141 can generate metadata that lists different versions of web service 131 and can compile statistics regarding the frequency and/or relative use of each version. The metadata for each version of web service 131 can identify each API or service endpoint, indicate the methods and/or operations provided by each service endpoint, and include request information and response information for each operation.

Machine learning component 141 can output metadata and statistics using various types of machine-readable formats and/or data structures including lists and tables. The metadata and statistics generated by machine learning component 141 can be updated and/or modified as additional network traffic is captured and analyzed. The updating of metadata and statistics can be performed automatically, periodically, and/or on-demand Computer system 130 includes a service documentation generator 143 configured to automatically generate service documentation from metadata and/or statistics output by machine learning component. Service documentation generator 143 can receive the metadata and statistics from machine learning component 141 and/or can retrieve metadata and statistics from usage data storage 142. Service documentation generator can store service data including service documentation service data storage 144.

Service documentation generator 143 can translate machine-readable metadata and generate service documentation in various types of human-readable formats. In some implementations, service documentation can be generated by populating a template or web form with metadata and/or statistics. Service documentation generator 143 can employ client interface 138 to communicate service documentation over network 120 to one or more of client devices 110 (e.g., a computing device used by a developer). Alternatively or additionally, a developer (or other user) can employ one of client devices 110 and client interface 138 to access service documentation that is stored in service data storage 144.

Service documentation can be output or presented as one or more interactive user interfaces, web documents, and/or web pages, as a viewable electronic document, and/or as a printed document. When provided in an interactive format, the service documentation can include functionality for navigating to portions that correspond to different versions of the web service, different service endpoints for a version of the web service, and different operations provided by a service endpoint. The service documentation can include or link to version statistics pertaining to usage of different versions of the web service, service endpoint statistics pertaining to usage of different service endpoints for a version of the web service, and operation statistics pertaining to usage of different operations at a service endpoint.

The service documentation for web service 131 can include a listing of versions and statistics pertaining to the usage of the different versions. Selecting a version can present information that includes a listing of APIs and/or service endpoints 132-134, an indication of the most frequently used APIs and/or service endpoints, and statistics pertaining to the usage of such APIs and/or service endpoints 132-134. Selecting a service endpoint can present information that includes a listing of methods or operations, an indication of the most frequently used methods or operations, and statistics pertaining to the usage of such methods or operations. Selecting a method or operation can present request information and response information for such method or operation. The request information can include a sample request message, a listing of mandatory input arguments, a listing of optional input arguments, frequent values for each mandatory and optional input argument, and statistics for such values. The response information can include a sample response message, a listing of output arguments, frequent values for each output argument, and statistics for such values.

Service documentation can be presented in a user interface that provides functionality for searching, filtering, and/or sorting the service documentation. The user interface can allow the service documentation to be searched, filtered, and/or sorted based on a single criterion or combination of criteria included in service documentation. The criteria for searching, filtering, and/or sorting the service documentation can include version information, service endpoint information, operation information, and/or argument information including any type of request message data (e.g., methods, paths, headers, body data, parameters, values, etc.) and/or response message data (e.g., status codes, reasons, headers, body data, parameters, values, etc.) to produce service documentation that is specific to the needs of the consumer. For instance, the service documentation can be searched and/or filtered using a fixed client property to view requests that are commonly sent with a specific client property. As an example, the service documentation can be filtered based on user-agent (e.g., software client, application type, operating system, software vendor, software revision, etc.) for viewing requests that are commonly sent with a specific user-agent.

Computer system 130 includes a synthetic request generator 145 configured to generate synthetic requests to web service 131. In some scenarios, the captured network traffic that is based on the actual usage of web service 131 may not fully demonstrate the functionality offered by web service 131. In such scenarios, synthetic request generator 145 can be employed to generate synthetic requests that illicit responses from web service 131 so that all APIs, service endpoints 132-134, and/or operations can be observed and analyzed. Synthetic requests also can be generated proactively to explore and/or test the functionality of web service 131.

Synthetic request generator 145 can direct synthetic requests to one or more of service endpoints 132-134, and network traffic capturer 139 can collect the synthetic requests and the corresponding responses. The synthetic requests can include various input arguments, and the responses to the synthetic requests can be analyzed by machine learning component 141 to determine or infer the exact type of a certain input argument and/or whether such input argument is mandatory, even when no actual network traffic has demonstrated this information. New metadata can be generated based on the responses to the synthetic requests, and service documentation generator 143 can produce updated service documentation.

In the embodiment shown in FIG. 1, network traffic capturer 139, traffic data storage 140, machine learning component 141, usage data storage 142, service documentation generator 143, service data storage 144, and synthetic request generator 145 can be implemented by computer system 130 (e.g., on a server, on middleware in a datacenter, etc.). In another embodiment, such computer programs modules and/or data stores can be implemented by and/or integrated with web service 131. It is also to be understood that such computer program modules and/or data stores can be positioned anywhere along the communication path from client devices 110 to web service 131 and, in some embodiments, can be implemented by one or more of client devices 110 and/or by network 120.

Exemplary User Interface

Figure 2:
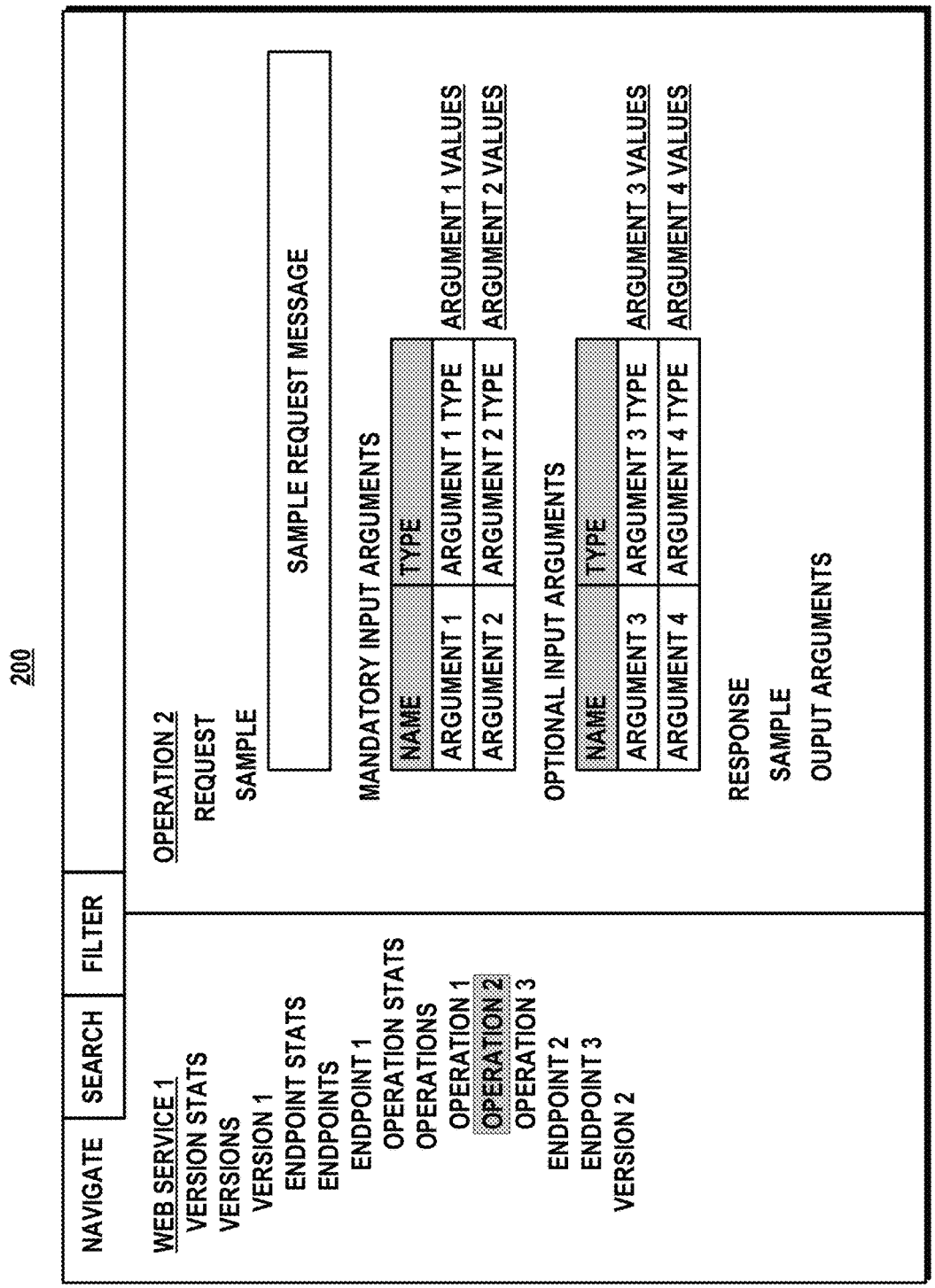
FIG. 2 illustrates an embodiment of an exemplary user interface in accordance with aspects of the described subject matter.

FIG. 2 illustrates a user interface 200 as an embodiment of an exemplary user interface that can implement aspects of the described subject matter. For instance, user interface 200 can be displayed by one of client devices 110 or other suitable computing device to present service documentation to a developer of web service 131 or other user of computer system 130. It is to be appreciated that various other types of user interfaces can be implemented along with or instead of user interface 200 to present service documentation.

User interface 200 includes functionality for navigating to portions of service documentation for multiple versions of a web service such as web service 131 or other web service. Portions of the service documentation can correspond to different versions of the web service, different service endpoints for a version of the web service, and different operations provided by a service endpoint. The service documentation can include version statistics pertaining to usage of different versions of the web service, service endpoint statistics pertaining to usage of different service endpoints for a version of the web service, and operation statistics pertaining to usage of different operations at a service endpoint.

As shown, user interface 200 can present service documentation corresponding to an operation (e.g., operation 2) provided by a service endpoint (e.g., endpoint 1) for a version (e.g., version 1) of a web service (e.g., web service 1). The service documentation for the operation includes request information and response information, which are automatically created from metadata that is generated based on an analysis of captured requests to and responses from the service endpoint of the web service.

The request information includes a sample request message, a listing of mandatory input arguments, and a listing of optional input arguments. The sample request message can be selected from frequent requests obtained from actual network traffic. Additional relevant information such as a name, a type, and a link to frequent values can be provided for each mandatory and optional input argument. In some implementations, selection of the link can present frequent values for the input argument as well as statistics for such values. Similarly, the response information can include a sample response message obtained from actual network traffic and a listing of output arguments. A name, a type, and a link to frequent values (and/or statistics for such values) can be provided for each output argument.

As shown, user interface 200 also includes functionality for searching and filtering service documentation. For instance, the service documentation can be searched and/or filtered based on various types of version information, service endpoint information, operation information, and/or argument information including any type of request message data (e.g., methods, paths, headers, body data, parameters, values, etc.) and/or response message data (e.g., status codes, reasons, headers, body data, parameters, values, etc.) to produce or view particular service documentation.

Exemplary Process

Figure 3:
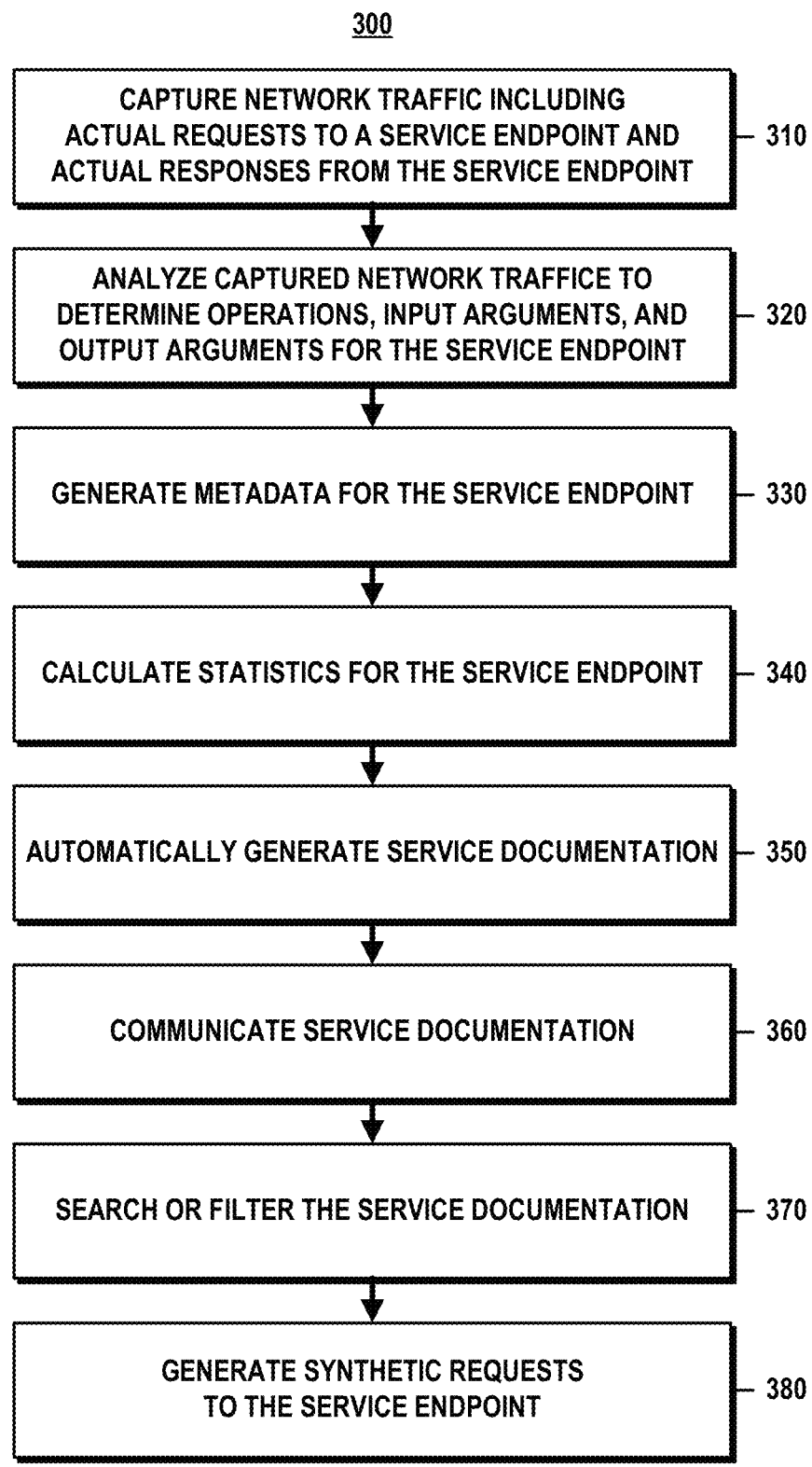
FIG. 3 illustrates an embodiment of an exemplary process in accordance with aspects of the described subject matter.

Referring to FIG. 3, with continuing reference to the foregoing figures, a computer-implemented method 300 is illustrated as an embodiment of an exemplary process in accordance with aspects of the described subject matter. Computer-implemented method 300, or portions thereof, can be performed by one or more computing devices, a computer system, computer-executable instructions, software, hardware, firmware or a combination thereof in various embodiments. For example, computer-implemented method 300 can be performed by computer system 130 or other suitable computer system to automatically generate service documenting based on usage of web service 131.

At 310, a computer system can capture network traffic including actual requests to a service endpoint of the web service and actual responses from the service endpoint of the web service. For example, computer system 130 can implement and employ network traffic capturer 139 to monitor and capture network traffic including actual HTTP requests to and actual HTTP responses from service endpoints 132-134 of web service 131.

Network traffic capturer 139 can capture successful and failed requests including input arguments contained within the header and/or body of a request. The input arguments can include headers supplied in actual requests to service endpoints 132-134 and message body content supplied in actual requests to service endpoints 132-134. Network traffic capturer 139 can capture responses to successful and failed requests including output arguments contained within the header and/or body of a response. The output arguments can include headers provided in actual responses from service endpoints 132-134, status codes provided in actual responses from service endpoints 132-134, and message body content provided in actual responses from service endpoints 132-134.

At 320, the computer system can analyze captured network traffic to determine one or more operations that are available at the service endpoint, input arguments that are accepted by the service endpoint, and output arguments that are provided by the service endpoint. For example, computer system 130 can implement and employ machine learning component 141 to analyze captured network traffic including actual HTTP requests to and actual HTTP responses from service endpoints 132-134 of web service 131. Captured network traffic for service endpoints 132-134 can be analyzed to identify APIs and service endpoints 132-134 of web service 131 and to determine operations or methods that are available at service endpoints 132-134. Analyzing captured network traffic can include selecting an actual request to a service endpoint for use as a sample request message and/or selecting an actual response from a service endpoint for use as a sample response message.

Machine learning component 141 can analyze captured network traffic to identify input arguments for APIs, endpoints 132-134, and/or operations and determine or infer whether each of the input arguments is mandatory or optional. Machine learning component 141 can determine or infer a data type of each input argument and/or frequent values for the input arguments.

At 330, the computer system can generate metadata for the service endpoint. For example, computer system 130 can implement and employ machine learning component 141 to generate metadata for one or more of service endpoints 132-134 that identifies the operations that are available at such service endpoints 132-134, the input arguments that are accepted by such service endpoints 132-134, and the output arguments that are provided by such service endpoints 132-134. The metadata also can include sample request messages and response messages for service endpoints 132-134.

At 340, the computer system can calculate statistics for the service endpoint. For example, computer system 130 can implement and employ machine learning component 141 to calculate statistics pertaining to usage of one or more of service endpoints 132-134 of web service 131, usage of the operations of such service endpoints 132-134, usage of values for input arguments, and usage of different versions of web service 131. Usage statistics for web service 131 can be utilized for indicating which APIs, service endpoints 132-134, and/or operations are requested or used most frequently.

At 350, the computer system can automatically generate service documentation for the web service based on the one or more operations, the input arguments, and the output arguments. For example, computer system 130 can implement and employ service documentation generator 143 to automatically generate service documentation for web service 131 based on the analysis performed by machine learning component 141 and/or the metadata and statistics output from machine learning component 141.

Service documentation for web service 131 can identify versions of web service 131 and statistics pertaining to the usage of the different versions. Service documentation for web service 131 can identify APIs and/or service endpoints 132-134, an indication of the most frequently used APIs and/or service endpoints, and statistics pertaining to the usage of such APIs and/or service endpoints 132-134. Service documentation for web service 131 can identify methods or operations that are available at an API or endpoint, an indication of the most frequently used methods or operations, and statistics pertaining to the usage of such methods or operations. Service documentation for web service 131 can present request information including a sample request message, a listing of mandatory input arguments, a listing of optional input arguments, frequent values for each mandatory and optional input argument, and statistics for such values. Service documentation for web service 131 can present response information including a sample response message, a listing of output arguments, frequent values for each output argument, and statistics for such values.

At 360, the computer system can communicate service documentation for the web service. For example, computer system 130 can communicate service documentation for web service 131 over network 120 for display on one or more of client devices 110. Service documentation for web service 131 can be output or presented as one as one or more interactive user interfaces, web documents, and/or web pages, such as user interface 200. Service documentation for web service 131 also can be output or presented as viewable electronic documents and/or printed documents.

At 370, the computer system can search or filter the service documentation. For example, computer system 130 can implement and employ client interface 138 and/or service documentation generator 143 to search or filter the service documentation for web service 131 based on message data included in actual requests to and/or responses from service endpoints 132-134. Criteria for searching, filtering, and/or sorting service documentation for web service 131 can include version information, service endpoint information, operation information, and/or argument information including any type of request message data and/or response message data to produce service documentation that is specific to the needs of the consumer.

At 380, the computer system can generate synthetic requests to the service endpoint. For example, computer system 130 can implement and employ synthetic request generator 145 to generate and issue synthetic requests to one or more of service endpoints 132-134 for exploring the functionality of web service 131. Network traffic capturer 139 can be implemented and employed by computer system 130 to capture the synthetic requests and responses to the synthetic requests. Machine learning component 141 can be implemented and employed by computer system 130 to analyze the synthetic requests and responses to the synthetic requests for determining additional operations that are available at service endpoints 132-134, input arguments that are accepted by service endpoints 132-134 to perform the additional operations, and output arguments that are provided by service endpoints 132-134 when the additional operations are performed.

As described above, service documentation can be generated automatically for web service 131 and/or any type of "black-box" web service based on actual usage of such web service and without requiring access to its underlying code. Service documentation generated from actual usage can better represent the actual functionality of web service 131. Service documentation can be generated remotely from web service 131 anywhere along the communication path between client devices 110 and web service 131.

Service documentation can be generated automatically using machine learning to reduce the burden on developers when producing relevant and up-to-date information regarding the functionality of web service 131. Developer efficiency is improved by eliminating the overhead of manually creating service documentation and/or embedding metadata within the code of web service 131.

Frequent requests and responses captured in actual network traffic can be selected as samples and included in the service documentation to ensure that such samples are relevant to a consumer of the service documentation. Synthetic requests can be generating and issued to web service 131 for exploring its functionality, even when the actual network traffic does not demonstrate all of the APIs, service endpoints, and/or operations of web service 131.

Exemplary Operating Environments

Aspects of the described subject matter can be implemented for and/or by various operating environments, computer networks, platforms, frameworks, computer architectures, and/or computing devices. Aspects of the described subject matter can be implemented by computer-executable instructions that can be executed by one or more computing devices, computer systems, and/or processors.

In its most basic configuration, a computing device and/or computer system can include at least one processing unit (e.g., single-processor units, multi-processor units, single-core units, and/or multi-core units) and memory. Depending on the exact configuration and type of computer system or computing device, the memory implemented by a computing device and/or computer system can be volatile (e.g., random access memory (RAM)), non-volatile (e.g., read-only memory (ROM), flash memory, and the like), or a combination thereof.

A computing device and/or computer system can have additional features and/or functionality. For example, a computing device and/or computer system can include hardware such as additional storage (e.g., removable and/or non-removable) including, but not limited to: solid state, magnetic, optical disk, or tape.

A computing device and/or computer system typically can include or can access a variety of computer-readable media. For instance, computer-readable media can embody computer-executable instructions for execution by a computing device and/or a computer system. Computer readable media can be any available media that can be accessed by a computing device and/or a computer system and includes both volatile and non-volatile media, and removable and non-removable media. As used herein, the term "computer-readable media" includes computer-readable storage media and communication media.

The term "computer-readable storage media" as used herein includes volatile and nonvolatile, removable and non-removable media for storage of information such as computer-executable instructions, data structures, program modules, or other data. Examples of computer-readable storage media include, but are not limited to: memory storage devices such as RAM, ROM, electrically erasable program read-only memory (EEPROM), semiconductor memories, dynamic memory (e.g., dynamic random access memory (DRAM), synchronous dynamic random access memory (SDRAM), double data rate synchronous dynamic random-access memory (DDR SDRAM), etc.), integrated circuits, solid-state drives, flash memory (e.g., NAN-based flash memory), memory chips, memory cards, memory sticks, thumb drives, and the like; optical storage media such as Blu-ray discs, digital video discs (DVDs), compact discs (CDs), CD-ROM, optical disc cartridges, and the like; magnetic storage media including hard disk drives, floppy disks, flexible disks, magnetic cassettes, magnetic tape, and the like; and other types of computer-readable storage devices. It can be appreciated that various types of computer-readable storage media (e.g., memory and additional hardware storage) can be part of a computing device and/or a computer system. As used herein, the terms "computer-readable storage media" and "computer-readable storage medium" do not mean and unequivocally exclude a propagated signal, a modulated data signal, a carrier wave, or any other type of transitory computer-readable medium.

Communication media typically embodies computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

In various embodiments, aspects the described subject matter can be implemented by computer-executable instructions stored on one or more computer-readable storage media. Computer-executable instructions can be implemented using any various types of suitable programming and/or markup languages such as: Extensible Application Markup Language (XAML), XML, XBL HTML, XHTML, XSLT, XMLHttpRequestObject, CSS, Document Object Model (DOM), Java®, JavaScript, JavaScript Object Notation (JSON), Jscript, ECMAScript, Ajax, Flash®, Silverlight™, Visual Basic® (VB), VBScript, PHP, ASP, Shockwave®, Python, Perl®, C, Objective-C, C++, C#/.net, and/or others.

A computing device and/or computer system can include various input devices, output devices, communication interfaces, and/or other types of devices. Exemplary input devices include, without limitation: a user interface, a keyboard/keypad, a touch screen, a touch pad, a pen, a mouse, a trackball, a remote control, a game controller, a camera, a barcode reader, a microphone or other voice input device, a video input device, laser range finder, a motion sensing device, a gesture detection device, and/or other type of input mechanism and/or device. A computing device can provide a Natural User Interface (NUI) that enables a user to interact with the computing device in a "natural" manner, free from artificial constraints imposed by input devices such as mice, keyboards, remote controls, and the like. Examples of NUI technologies include, without limitation: voice and/or speech recognition, touch and/or stylus recognition, motion and/or gesture recognition both on screen and adjacent to a screen using accelerometers, gyroscopes and/or depth cameras (e.g., stereoscopic or time-of-flight camera systems, infrared camera systems, RGB camera systems and/or combination thereof), head and eye tracking, gaze tracking, facial recognition, 3D displays, immersive augmented reality and virtual reality systems, technologies for sensing brain activity using electric field sensing electrodes (EEG and related methods), intention and/or goal understanding, and machine intelligence.

A computing device can be configured to receive and respond to input in various ways depending upon implementation. Responses can be presented in various forms including, for example: presenting a user interface, outputting an object such as an image, a video, a multimedia object, a document, and/or other type of object; outputting a text response; providing a link associated with responsive content; outputting a computer-generated voice response or other audio; or other type of visual and/or audio presentation of a response. Exemplary output devices include, without limitation: a display, a projector, a speaker, a printer, and/or other type of output mechanism and/or device.

A computing device and/or computer system can include one or more communication interfaces that allow communication between and among other computing devices and/or computer systems. Communication interfaces can be used in the context of network communication between and among various computing devices and/or computer systems. Communication interfaces can allow a computing device and/or computer system to communicate with other devices, other computer systems, web services (e.g., an affiliated web service, a third-party web service, a remote web service, and the like), web service applications, and/or information sources (e.g. an affiliated information source, a third-party information source, a remote information source, and the like). As such communication interfaces can be used in the context of accessing, obtaining data from, and/or cooperating with various types of resources.

Communication interfaces also can be used in the context of distributing computer-executable instructions over a network or combination of networks. For example, computer-executable instructions can be combined or distributed utilizing remote computers and storage devices. A local or terminal computer can access a remote computer or remote storage device and download a computer program or one or more parts of the computer program for execution. It also can be appreciated that the execution of computer-executable instructions can be distributed by executing some instructions at a local terminal and executing some instructions at a remote computer.

A computing device can be implemented by a mobile computing device such as: a mobile phone (e.g., a cellular phone, a smart phone such as a Microsoft® Windows® phone, an Apple iPhone, a BlackBerry® phone, a phone implementing a Google® Android™ operating system, a phone implementing a Linux® operating system, or other type of phone implementing a mobile operating system), a tablet computer (e.g., a Microsoft® Surface® device, an Apple iPad™, a Samsung Galaxy Note® Pro, or other type of tablet device), a laptop computer, a notebook computer, a netbook computer, a personal digital assistant (PDA), a portable media player, a handheld gaming console, a wearable computing device (e.g., a smart watch, a head-mounted device including smart glasses such as Google® Glass™, a wearable monitor, etc.), a personal navigation device, a vehicle computer (e.g., an on-board navigation system), a camera, or other type of mobile device.

A computing device can be implemented by a stationary computing device such as: a desktop computer, a personal computer, a server computer, an entertainment system device, a media player, a media system or console, a video-game system or console, a multipurpose system or console (e.g., a combined multimedia and video-game system or console such as a Microsoft® Xbox® system or console, a Sony® PlayStation® system or console, a Nintendo® system or console, or other type of multipurpose game system or console), a set-top box, an appliance (e.g., a television, a refrigerator, a cooking appliance, etc.), or other type of stationary computing device.

A computing device also can be implemented by other types of processor-based computing devices including digital signal processors, field-programmable gate arrays (FPGAs), program- and application-specific integrated circuits (PASIC/ASICs), program- and application-specific standard products (PSSP/ASSPs), a system-on-a-chip (SoC), complex programmable logic devices (CPLDs), and the like.

A computing device can include and/or run one or more computer programs implemented, for example, by software, firmware, hardware, logic, and/or circuitry of the computing device. Computer programs can be distributed to and/or installed on a computing device in various ways. For instance, computer programs can be pre-installed on a computing device by an original equipment manufacturer (OEM), installed on a computing device as part of installation of another computer program, downloaded from an application store and installed on a computing device, distributed and/or installed by a system administrator using an enterprise network management tool, and distributed and/or installed in various other ways depending upon the implementation.

Computer programs implemented by a computing device can include one or more operating systems. Exemplary operating systems include, without limitation: a Microsoft® operating system (e.g., a Microsoft® Windows® operating system), a Google® operating system (e.g., a Google® Chrome OS™ operating system or a Google® Android™ operating system), an Apple operating system (e.g., a Mac OS® or an Apple iOS™ operating system), an open source operating system, or any other operating system suitable for running on a mobile, stationary, and/or processor-based computing device.

Computer programs implemented by a computing device can include one or more client applications. Exemplary client applications include, without limitation: a web browsing application, a communication application (e.g., a telephony application, an e-mail application, a text messaging application, an instant messaging application, a web conferencing application, and the like), a media application (e.g., a video application, a movie service application, a television service application, a music service application, an e-book application, a photo application, and the like), a calendar application, a file sharing application, a personal assistant or other type of conversational application, a game application, a graphics application, a shopping application, a payment application, a social media application, a social networking application, a news application, a sports application, a weather application, a mapping application, a navigation application, a travel application, a restaurants application, an entertainment application, a healthcare application, a lifestyle application, a reference application, a finance application, a business application, an education application, a productivity application (e.g., word processing application, a spreadsheet application, a slide show presentation application, a note-taking application, and the like), a security application, a tools application, a utility application, and/or any other type of application, application program, and/or app suitable for running on a mobile, stationary, and/or processor-based computing device.

Computer programs implemented by a computing device can include one or more server applications. Exemplary server applications include, without limitation: one or more server-hosted, cloud-based, and/or online applications associated with any of the various types of exemplary client applications described above; one or more server-hosted, cloud-based, and/or online versions of any of the various types of exemplary client applications described above; one or more applications configured to provide a web service, a web site, a web page, web content, and the like; one or more applications configured to provide and/or access an information source, data store, database, repository, and the like; and/or other type of application, application program, and/or app suitable for running on a server computer.

A computer system can be implemented by a computing device, such as a server computer, or by multiple computing devices configured to implement a service in which one or more suitably-configured computing devices perform one or more processing steps. A computer system can be implemented as a distributed computing system in which components are located on different computing devices that are connected to each other through network (e.g., wired and/or wireless) and/or other forms of direct and/or indirect connections. A computer system also can be implemented via a cloud-based architecture (e.g., public, private, or a combination thereof) in which services are delivered through shared datacenters. For instance, a computer system can be implemented by physical servers of a datacenter that provide shared computing and storage resources and that host virtual machines having various roles for performing different tasks in conjunction with providing cloud-based services. Exemplary virtual machine roles can include, without limitation: web server, front end server, application server, database server (e.g., SQL server), domain controller, domain name server, directory server, and/or other suitable machine roles. Some components of a computer system can be disposed within a cloud while other components are disposed outside of the cloud.

Figure 4:
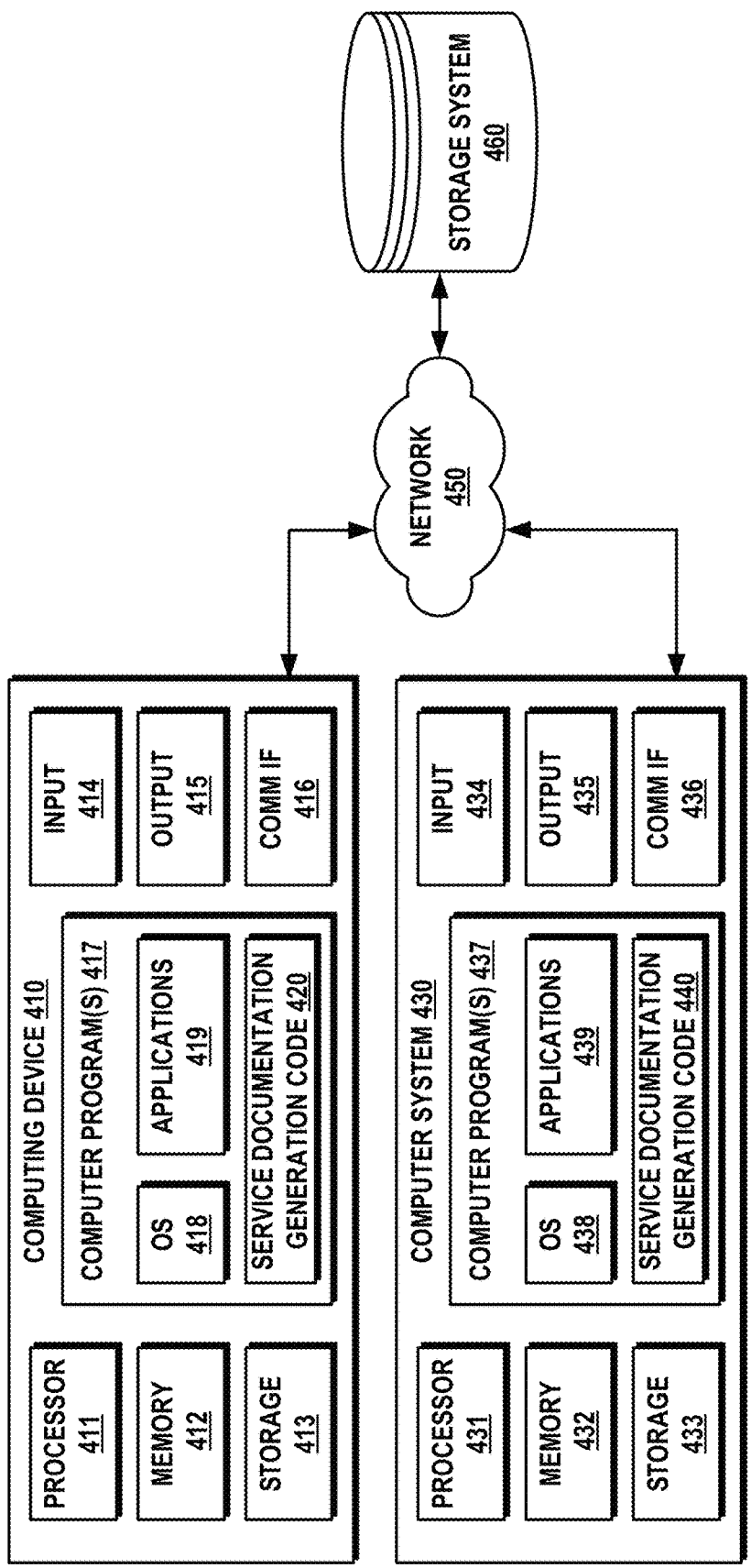
FIG. 4 illustrates an embodiment of an exemplary operating environment that can implement aspects of the described subject matter.

FIG. 4 illustrates an operating environment 400 as an embodiment of an exemplary operating environment that can implement aspects of the described subject matter. It is to be appreciated that operating environment 400 can be implemented by a client-server model and/or architecture as well as by other operating environment models and/or architectures in various embodiments.

Operating environment 400 includes a computing device 410, which can implement aspects of the described subject matter. Computing device 410 includes a processor 411 and memory 412. Computing device 410 also includes additional hardware storage 413. It is to be understood that computer-readable storage media includes memory 412 and hardware storage 413.

Computing device 410 includes input devices 414 and output devices 415. Input devices 414 can include one or more of the exemplary input devices described above and/or other type of input mechanism and/or device. Output devices 415 can include one or more of the exemplary output devices described above and/or other type of output mechanism and/or device.

Computing device 410 contains one or more communication interfaces 416 that allow computing device 410 to communicate with other computing devices and/or computer systems. Communication interfaces 416 also can be used in the context of distributing computer-executable instructions.

Computing device 410 can include and/or run one or more computer programs 417 implemented, for example, by software, firmware, hardware, logic, and/or circuitry of computing device 410. Computer programs 417 can include an operating system 418 implemented, for example, by one or more exemplary operating systems described above and/or other type of operating system suitable for running on computing device 410. Computer programs 417 can include one or more applications 419 implemented, for example, by one or more exemplary applications described above and/or other type of application suitable for running on computing device 410.

Computer programs 417 can be configured via one or more suitable interfaces (e.g., API or other data connection) to communicate and/or cooperate with one or more resources. Examples of resources include local computing resources of computing device 410 and/or remote computing resources such as server-hosted resources, cloud-based resources, online resources, remote data stores, remote databases, remote repositories, web services, web sites, web pages, web content, and/or other types of remote resources.

Computer programs 417 can implement computer-executable instructions that are stored in computer-readable storage media such as memory 412 or hardware storage 413, for example. Computer-executable instructions implemented by computer programs 417 can be configured to work in conjunction with, support, and/or enhance one or more of operating system 418 and applications 419. Computer-executable instructions implemented by computer programs 417 also can be configured to provide one or more separate and/or stand-alone services.

Computing device 410 and/or computer programs 417 can implement and/or perform various aspects of the described subject matter. As shown, computing device 410 and/or computer programs 417 can include service documentation generation code 420. In various embodiments, service documentation generation code 420 can include computer-executable instructions that are stored on a computer-readable storage medium and configured to implement one or more aspects of the described subject matter. By way of example, and without limitation, service documentation generation code 420 can be implemented by computing device 410 which, in turn, can represent any one of client devices 110 and display user interface 200. By way of further example, and without limitation, service documentation generation code 420 can implement one or more of network traffic capturer 139, machine learning component 141, service documentation generator 143, and synthetic request generator 145 and/or perform one or more aspects of computer-implemented method 300.

Operating environment 400 includes a computer system 430, which can implement aspects of the described subject matter. Computer system 430 can be implemented by one or more computing devices such as one or more server computers. Computer system 430 includes a processor 431 and memory 432. Computer system 430 also includes additional hardware storage 433. It is to be understood that computer-readable storage media includes memory 432 and hardware storage 433.

Computer system 430 includes input devices 434 and output devices 435. Input devices 434 can include one or more of the exemplary input devices described above and/or other type of input mechanism and/or device. Output devices 435 can include one or more of the exemplary output devices described above and/or other type of output mechanism and/or device.

Computer system 430 contains one or more communication interfaces 436 that allow computer system 430 to communicate with various computing devices (e.g., computing device 410) and/or other computer systems. Communication interfaces 436 also can be used in the context of distributing computer-executable instructions.

Computer system 430 can include and/or run one or more computer programs 437 implemented, for example, by software, firmware, hardware, logic, and/or circuitry of computer system 430. Computer programs 437 can include an operating system 438 implemented, for example, by one or more exemplary operating systems described above and/or other type of operating system suitable for running on computer system 430. Computer programs 437 can include one or more applications 439 implemented, for example, by one or more exemplary applications described above and/or other type of application suitable for running on computer system 430.

Computer programs 437 can be configured via one or more suitable interfaces (e.g., API or other data connection) to communicate and/or cooperate with one or more resources. Examples of resources include local computing resources of computer system 430 and/or remote computing resources such as server-hosted resources, cloud-based resources, online resources, remote data stores, remote databases, remote repositories, web services, web sites, web pages, web content, and/or other types of remote resources.

Computer programs 437 can implement computer-executable instructions that are stored in computer-readable storage media such as memory 432 or hardware storage 433, for example. Computer-executable instructions implemented by computer programs 437 can be configured to work in conjunction with, support, and/or enhance one or more of operating system 438 and applications 439. Computer-executable instructions implemented by computer programs 437 also can be configured to provide one or more separate and/or stand-alone services.

Computing system 430 and/or computer programs 437 can implement and/or perform various aspects of the described subject matter. As shown, computer system 430 and/or computer programs 437 can include service documentation generation code 440. In various embodiments, service documentation generation code 440 can include computer-executable instructions that are stored on a computer-readable storage medium and configured to implement one or more aspects of the described subject matter. By way of example, and without limitation, service documentation generation code 440 can be implemented by computer system 430 which, in turn, can represent computer system 130. By way of further example, and without limitation, service documentation generation code 440 can implement one or more of network traffic capturer 139, machine learning component 141, service documentation generator 143, and synthetic request generator 145 and/or perform one or more aspects of computer-implemented method 300.

Computing device 410 and computer system 430 can communicate over network 450, which can be implemented by any type of network or combination of networks suitable for providing communication between computing device 410 and computer system 430. Network 450 can include, for example and without limitation: a WAN such as the Internet, a LAN, a telephone network, a private network, a public network, a packet network, a circuit-switched network, a wired network, and/or a wireless network. Computing device 410 and computer system 430 can communicate over network 450 using various communication protocols and/or data types. One or more communication interfaces 416 of computing device 410 and one or more communication interfaces 436 of computer system 430 can be employed in the context of communicating over network 450.

Computing device 410 and/or computer system 430 can communicate with a storage system 460 over network 450. Alternatively or additionally, storage system 460 can be integrated with computing device 410 and/or computer system 430. Storage system 460 can be representative of various types of storage in accordance with the described subject matter. For example, storage system 460 can implement one or more of content databases 135-137, traffic data storage 140, usage data storage 142, and/or service data storage 144. Storage system 460 can provide any suitable type of data storage for relational (e.g., SQL) and/or non-relational (e.g., NO-SQL) data using database storage, cloud storage, table storage, blob storage, file storage, queue storage, and/or other suitable type of storage mechanism. Storage system 460 can be implemented by one or more computing devices, such as a computer cluster in a datacenter, by virtual machines, and/or provided as a cloud-based storage service.

Figure 5:
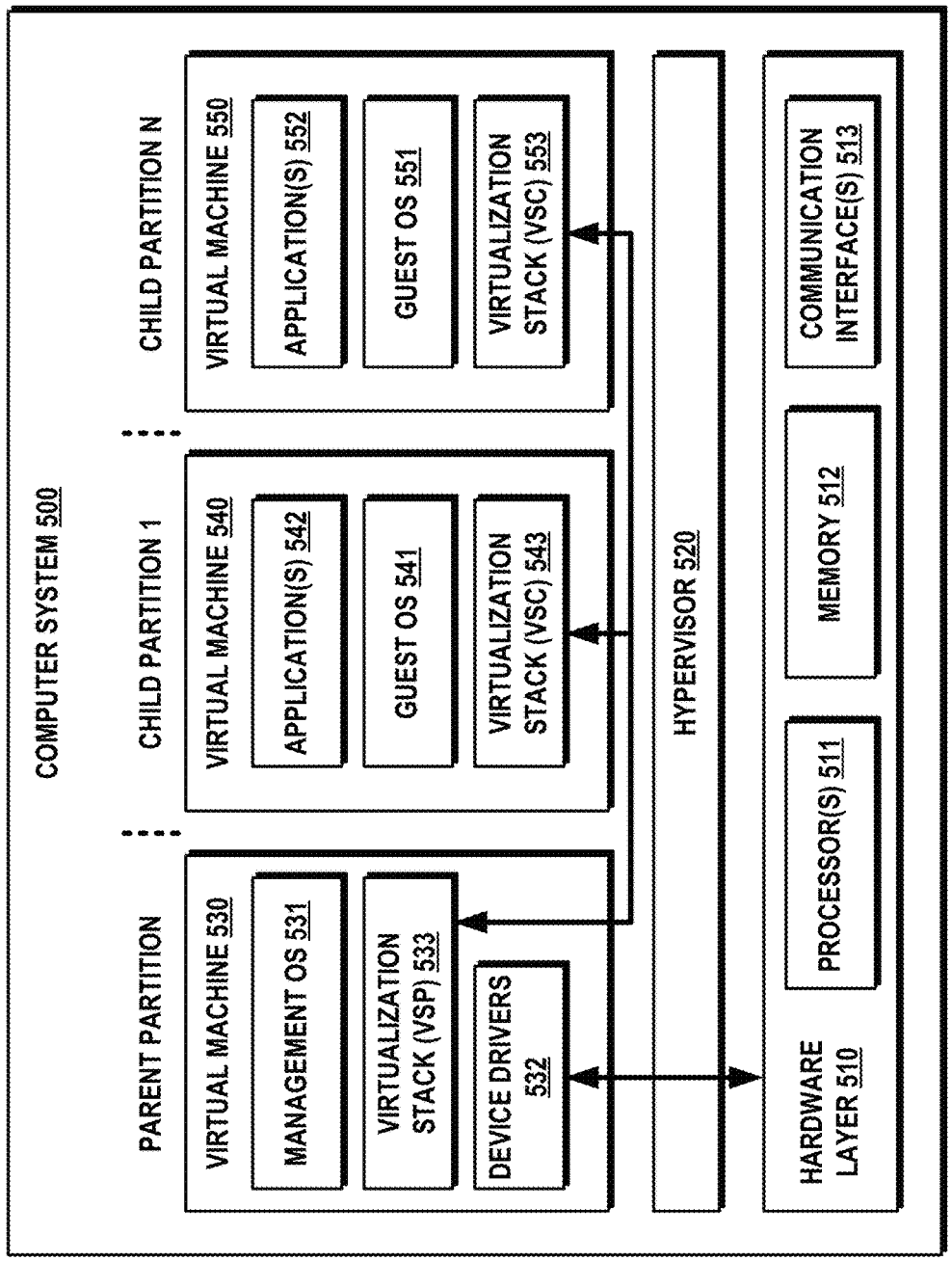
FIG. 5 illustrates an embodiment of an exemplary computer system that can implement aspects of the described subject matter.

FIG. 5 illustrates a computer system 500 as an embodiment of an exemplary computer system that can implement aspects of the described subject matter. In various implementations, deployment of computer system 500 and/or multiple deployments thereof can provide server virtualization for concurrently running multiple virtual servers instances on one physical host server computer and/or network virtualization for concurrently running multiple virtual network infrastructures on the same physical network.

Computer system 500 can be implemented by various computing devices such as one or more physical server computers that provide a hardware layer 510 which includes processor(s) 511, memory 512, and communication interface(s) 513. Computer system 500 implements a hypervisor 520 configured to manage, control, and/or arbitrate access to hardware layer 510. In various implementations, hypervisor 520 can manage hardware resources to provide isolated execution environments or partitions such a parent (root) partition and one or more child partitions. A parent partition can operate to create one or more child partitions. Each partition can be implemented as an abstract container or logical unit for isolating processor and memory resources managed by hypervisor 520 and can be allocated a set of hardware resources and virtual resources. A logical system can map to a partition, and logical devices can map to virtual devices within the partition.

Parent and child partitions can implement virtual machines such as virtual machines 530, 540, and 550, for example. Each virtual machine can emulate a physical computing device or computer system as a software implementation that executes programs like a physical machine. Each virtual machine can have one or more virtual processors and can provide a virtual system platform for executing an operating system (e.g., a Microsoft® operating system, a Google® operating system, an operating system from Apple®, a Linux® operating system, an open source operating system, etc.). As shown, virtual machine 530 in parent partition can run a management operating system 531, and virtual machines 540, 550 in child partitions can host guest operating systems 541, 551 each implemented, for example, as a full-featured operating system or a special-purpose kernel. Each of guest operating systems 541, 551 can schedule threads to execute on one or more virtual processors and effectuate instances of application(s) 542, 552, respectively.

Virtual machine 530 in parent partition has access to hardware layer 510 via device drivers 532 and/or other suitable interfaces. Virtual machines 540, 550 in child partitions, however, generally do not have access to hardware layer 510. Rather, such virtual machines 540, 550 are presented with a virtual view of hardware resources and are supported by virtualization services provided by virtual machine 530 in parent partition. Virtual machine 530 in parent partition hosts a virtualization stack 533 that provides virtualization management functionality including access to hardware layer 510 via device drivers 532. Virtualization stack 533 implements and/or operates as a virtualization services provider (VSP) to handle requests from and provide various virtualization services to a virtualization service client (VSC) implemented by one or more virtualization stacks 543, 553 in virtual machines 540, 550 that are operating in child partitions.

Computer system 500 can implement and/or perform various aspects of the described subject matter. By way of example, and without limitation, one or more virtual machines 540, 550 can implement functionality for automatically generating service documentation based on actual usage. By way of further example, and without limitation, one or more virtual machines 540, 550 can implement one or more aspects of computer system 130 and/or perform one or more aspects of computer-implemented method 300. In addition, hardware layer 510 can be implemented by one or more computing devices of computer system 130 and/or computer system 430.

Supported Aspects

The detailed description provided above in connection with the appended drawings explicitly describes and supports various aspects of automatically generating service documentation based on actual usage. By way of illustration and not limitation, supported aspects include a computer system for automatically generating service documentation based on usage of a web service, the computer system comprising: a processor configured to execute computer-executable instructions; and memory storing computer-executable instructions configured to: capture network traffic including actual requests to a service endpoint of the web service and actual responses from the service endpoint of the web service; analyze captured network traffic to determine one or more operations that are available at the service endpoint, input arguments that are accepted by the service endpoint, and output arguments that are provided by the service endpoint; generate metadata for the service endpoint that identifies the one or more operations, the input arguments, and the output arguments; automatically generate service documentation for the web service based on the metadata; and communicate the service documentation for the web service to a client device.

Supported aspects include the forgoing computer system, wherein the input arguments include one or more of: headers supplied in the actual requests to the service endpoint and message body content supplied in the actual requests to the service endpoint.

Supported aspects include any of the forgoing computer systems, wherein the output arguments include one or more of: headers provided in the actual responses from the service endpoint, status codes provided in the actual responses from the service endpoint, and message body content provided in the actual responses from the service endpoint.

Supported aspects include any of the forgoing computer systems, wherein analyzing the captured network traffic comprises determining whether each of the input arguments is mandatory or optional.

Supported aspects of automatic generation of service documentation include any of the forgoing computer systems, wherein analyzing the captured network traffic comprises determining a data type of each input argument.

Supported aspects of automatic generation of service documentation include any of the forgoing computer systems, wherein analyzing the captured network traffic comprises determining frequent values for one or more of the input arguments.

Supported aspects of automatic generation of service documentation include any of the forgoing computer systems, wherein the memory further stores computer-executable instructions configured to select an actual request to the service endpoint for use as a sample request message.

Supported aspects of automatic generation of service documentation include any of the forgoing computer systems, wherein the memory further stores computer-executable instructions configured to calculate statistics pertaining to one or more of: usage of the operations of the service endpoint, usage of values for the input arguments, usage of different service endpoints of the web service, and usage of different versions of the web service.

Supported aspects of automatic generation of service documentation include any of the forgoing computer systems, wherein the memory further stores computer-executable instructions configured to search or filter the service documentation based on message data included in one or more actual requests to the service endpoint.

Supported aspects of automatic generation of service documentation include any of the forgoing computer systems, wherein the memory further stores computer-executable instructions configured to generate synthetic requests to the service endpoint.

Supported aspects include an apparatus, a computer-readable storage medium, a computer-implemented method, and/or means for implementing any of the foregoing computer systems or portions thereof.

Supported aspects include a computer-implemented method performed by a computer system to automatically generate service documenting based on usage of a web service, the computer-implemented method comprising: capturing network traffic including actual requests to a service endpoint of the web service and actual responses from the service endpoint of the web service; analyzing captured network traffic to determine one or more operations that are available at the service endpoint, input arguments that are accepted by the service endpoint, and output arguments that are provided by the service endpoint; and automatically generating service documentation for the web service based on the one or more operations, the input arguments, and the output arguments.

Supported aspects include the foregoing computer-implemented method, further comprising: generating metadata for the service endpoint that identifies the one or more operations, the input arguments, and the output arguments.

Supported aspects include any of the foregoing computer-implemented methods, further comprising: determining whether each of the input arguments is mandatory or optional.

Supported aspects include any of the foregoing computer-implemented methods, further comprising: selecting an actual request to the service endpoint for use as a sample request message.

Supported aspects include any of the foregoing computer-implemented methods, further comprising: calculating statistics pertaining to usage of the service endpoint.

Supported aspects include any of the foregoing computer-implemented methods, further comprising: filtering, by the computer system, the service documentation based on message data included in one or more actual requests to the service endpoint.

Supported aspects include any of the foregoing computer-implemented methods, further comprising: generating synthetic requests to the service endpoint; and analyzing the synthetic requests and responses to the synthetic requests to determine an additional operation that is available at the service endpoint, input arguments that are accepted by the service endpoint to perform the additional operation, and output arguments that are provided by the service endpoint when the additional operation is performed.

Supported aspects include a system, an apparatus, a computer-readable storage medium, and/or means for implementing and/or performing any of the foregoing computer-implemented methods or portions thereof.

Supported aspects include a computer-readable storage medium storing computer-executable instructions that, when executed by a computer system, cause the computer system to implement: a network traffic capturer configured to capture actual requests to a service endpoint of a web service and capture actual responses from the service endpoint of the web service; a machine learning component configured to analyze captured network traffic and generate metadata that identifies one or more operations that are available at the service endpoint, input arguments that are accepted by the service endpoint, and output arguments that are provided by the service endpoint; and a service documentation generator configured to automatically generate service documentation for the web service based on the metadata.

Supported aspects include the forgoing computer-readable storage medium, wherein the machine learning component is further configured to: determine a data type of each input argument, determine whether each of the input arguments is mandatory or optional, select an actual request to the service endpoint for use as a sample request, and calculate statistics pertaining to usage of the operations of the service endpoint.

Supported aspects include any of the forgoing computer-readable storage media, further storing computer-executable instructions that implement a synthetic request generator configured to generate synthetic requests to the service endpoints of the web service for exploring functionality of the web service.

Supported aspects include an apparatus, a system, a computer-implemented method, and/or means for implementing any of the foregoing computer-readable media or performing the functions thereof.

Supported aspects of the described subject matter provide various attendant and/or technical advantages. By way of illustration and not limitation, service documentation can be generated automatically for any type of "black-box" web service based on actual usage of such web service and without requiring access to its underlying code. Service documentation generated from actual usage of the web service can better represent the actual functionality of the web service. Service documentation can be generated remotely from the web service anywhere along the communication path between a client device and the web service.

Service documentation can be generated automatically using machine learning to reduce the burden on developers when producing relevant and up-to-date information regarding the functionality of a web service. The efficiency of web service development is improved by eliminating the need for developers to manually create service documentation and/or manually embed metadata within the code of the web service.

Frequent requests and responses captured in actual network traffic can be selected as samples and included in the service documentation to ensure that such samples are relevant to a consumer of the service documentation. Synthetic requests can be generating and issued to the web service for exploring the functionality of the web service even when the actual network traffic does not demonstrate all of the APIs, service endpoints, and/or operations of the web service.

Supported aspects can provide various attendant and/or technical advantages in terms of improved efficiency and/or savings with respect to power consumption, memory, processor cycles, and/or other computationally-expensive resources.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A computer system for automatically generating service documentation based on usage of a web service, the computer system comprising:
one or more computers including:
one or more input/output components configured to operatively communicate with a network;
a processor operatively coupled with the one or more input/output components and configured to execute computer-executable instructions; and
memory storing one or more computer-executable instructions that, when executed by the processor, perform operations configured to:
capture network traffic communicated via the one or more input/output components including one or more actual requests to a service endpoint of the web service and one or more actual responses from the service endpoint of the web service;
analyze the captured network traffic using one or more machine learning algorithms to determine one or more operations that are available at the service endpoint, one or more input arguments that are accepted by the service endpoint, and one or more output arguments that are provided by the service endpoint, including using the one or more machine learning algorithms to determine one or more mandatory input arguments that are necessary for successful operation of the web service based at least partially on analysis of (i) one or more output arguments that indicate an unsuccessful operation of the web service, and (ii) one or more output arguments that indicate a successful operation of the web service;

generate metadata based on the analysis of the captured network traffic for the service endpoint that identifies the one or more operations, the one or more input arguments, and the one or more output arguments;

automatically generate service documentation for the web service based on the metadata, the service documentation including at least identification of the one or more mandatory input arguments that are necessary for successful operation of the web service determined using the one or more machine learning algorithms; and communicate the service documentation for the web service to a client device.

2. The computer system of claim 1, wherein the one or more input arguments include one or more of: one or more headers supplied in the one or more actual requests to the service endpoint and message body content supplied in the one or more actual requests to the service endpoint.

3. The computer system of claim 1, wherein the one or more output arguments include one or more of: one or more headers provided in the one or more actual responses from the service endpoint, one or more status codes provided in the one or more actual responses from the service endpoint, and message body content provided in the one or more actual responses from the service endpoint.

4. The computer system of claim 1, wherein analyze the captured network traffic comprises determining whether each of the one or more input arguments is mandatory or optional.

5. The computer system of claim 1, wherein analyze the captured network traffic using one or more machine learning algorithms to determine one or more operations that are available at the service endpoint, one or more input arguments that are accepted by the service endpoint, and one or more output arguments that are provided by the service endpoint comprises:

analyze the captured network traffic using one or more machine learning algorithms to determine one or more operations that are available at the service endpoint, one or more input arguments that are accepted by the service endpoint, and one or more output arguments that are provided by the service endpoint, including using the one or more machine learning algorithms to determine one or more optional input arguments that are not necessary for successful operation of the web service based at least partially on the analysis of one or more output arguments that indicate a successful operation of the web service.

6. The computer system of claim 1, wherein analyze the captured network traffic using one or more machine learning algorithms comprises analyze the captured network traffic using one or more machine learning algorithms to infer one or more operations that are available at the service endpoint.

7. The computer system of claim 1, wherein the memory further stores computer-executable instructions configured to select an actual request to the service endpoint for use as a sample request message.

8. The computer system of claim 1, wherein the memory further stores computer-executable instructions configured to calculate statistics pertaining to one or more of: usage of the operations of the service endpoint, usage of values for the one or more input arguments, usage of different service endpoints of the web service, and usage of different versions of the web service.

9. The computer system of claim 1, wherein the memory further stores computer-executable instructions configured to search or filter the service documentation based on message data included in one or more actual requests to the service endpoint.

10. The computer system of claim 1, wherein the memory further stores computer-executable instructions configured to generate one or more synthetic requests to the service endpoint.

11. A computer-implemented method performed by a computer system to automatically generate service documenting based on usage of a web service, the computer-implemented method comprising:

capturing network traffic communicated via one or more input/output components including actual requests to a service endpoint of the web service and actual responses from the service endpoint of the web service;

analyzing the captured network traffic using one or more machine learning algorithms to determine one or more operations that are available at the service endpoint, one or more input arguments that are accepted by the service endpoint, and one or more output arguments that are provided by the service endpoint, including using the one or more machine learning algorithms to determine one or more mandatory input arguments that are necessary for successful operation of the web service based at least partially on analysis of (i) one or more output arguments that indicate an unsuccessful operation of the web service, and (ii) one or more output arguments that indicate a successful operation of the web service; and automatically generating service documentation for the web service based on the captured network traffic associated with the one or more operations, the one or more input arguments, and the one or more output arguments, the service documentation including at least identification of the one or more mandatory input arguments that are necessary for successful operation of the web service determined using the one or more machine learning algorithms.

12. The computer-implemented method of claim 11, further comprising: generating metadata for the service endpoint that identifies the one or more operations, the one or more input arguments, and the one or more output arguments.

13. The computer-implemented method of claim 11, further comprising: determining whether each of the one or more input arguments is mandatory or optional.

14. The computer-implemented method of claim 11, further comprising:

selecting an actual request to the service endpoint for use as a sample request message.

15. The computer-implemented method of claim 11, further comprising: calculating statistics pertaining to usage of the service endpoint.

16. The computer-implemented method of claim 11, further comprising: filtering, by the computer system, the service documentation based on message data included in one or more actual requests to the service endpoint.

17. The computer-implemented method of claim 11, further comprising:

generating one or more synthetic requests to the service endpoint; and analyzing the one or more synthetic requests and one or more responses to the one or more synthetic requests to determine an additional operation that is available at the service endpoint, one or more additional input arguments that are accepted by the service endpoint to perform the additional operation, and one or more additional output arguments that are provided by the service endpoint when the additional operation is performed.

18. A computer-readable storage medium storing computer-executable instructions that, when executed by a computer system, cause the computer system to implement:
a network traffic capturer configured to capture one or more actual requests communicated via one or more input/output components to a service endpoint of a web service and capture one or more actual responses communicated via the one or more input/output components from the service endpoint of the web service;
a machine learning component configured to analyze the captured network traffic using one or more machine learning algorithms and generate metadata based on the analysis of the captured network traffic that identifies one or more operations that are available at the service endpoint, one or more input arguments that are accepted by the service endpoint, and one or more output arguments that are provided by the service endpoint, including using the one or more machine learning algorithms to determine one or more mandatory input arguments that are necessary for successful operation of the web service based at least partially on analysis of (i) one or more output arguments that indicate an unsuccessful operation of the web service, and (ii) one or more output arguments that indicate a successful operation of the web service; and
a service documentation generator configured to automatically generate service documentation for the web service based on the metadata, the service documentation including at least identification of the one or more mandatory input arguments that are necessary for successful operation of the web service determined using the one or more machine learning algorithms.

19. The computer-readable storage medium of claim 18, wherein the machine learning component is further configured to: determine a data type of each input argument, determine whether each of the one or more input arguments is mandatory or optional, select an actual request to the service endpoint for use as a sample request, and calculate one or more statistics pertaining to usage of the operations of the service endpoint.

20. The computer-readable storage medium of claim 18, further storing computer-executable instructions that implement a synthetic request generator configured to generate one or more synthetic requests to the service endpoint of the web service for exploring functionality of the web service.

* * * * *